(12) United States Patent
Kinbara et al.

(10) Patent No.: US 6,769,962 B2
(45) Date of Patent: Aug. 3, 2004

(54) SCRAPING METHOD

(75) Inventors: Yoshihide Kinbara, Nagoya (JP);
Hisao Tanaka, Nagoya (JP); Akaru Usui, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 69 days.

(21) Appl. No.: 09/119,937

(22) Filed: Jul. 21, 1998

(65) Prior Publication Data

US 2001/0023163 A1 Sep. 20, 2001

(30) Foreign Application Priority Data

Jan. 26, 1998 (JP) ............................................ 10-012632

(51) Int. Cl.$^7$ ............................ B24B 1/00; B23K 26/18
(52) U.S. Cl. ............... 451/28; 219/121.69; 219/121.85; 451/53
(58) Field of Search .......................... 451/53, 231, 232, 451/236, 908, 28; 219/121.68, 121.69, 121.85, 121.6

(56) References Cited

U.S. PATENT DOCUMENTS

| | | | |
|---|---|---|---|
| 4,806,724 A | | 2/1989 | Kawai et al. |
| 4,986,664 A | | 1/1991 | Lovoi |
| 5,031,483 A | * | 7/1991 | Weaver |
| 5,630,953 A | | 5/1997 | Klink |
| 5,632,913 A | * | 5/1997 | Mori |
| 5,658,183 A | * | 8/1997 | Sandhu et al. |
| 5,679,060 A | * | 10/1997 | Leonard et al. |
| 5,730,642 A | * | 3/1998 | Sandhu et al. |
| 5,965,042 A | * | 10/1999 | Saitoh |
| 6,113,835 A | * | 9/2000 | Kato et al. |
| 6,262,390 B1 | * | 7/2001 | Goland et al. |

FOREIGN PATENT DOCUMENTS

| | | |
|---|---|---|
| CA | 2 145 450 C | 5/1996 |
| CA | 2236480 | 5/1997 |
| CA | 2205284 | 11/1997 |
| DE | A 41 25 165 | 2/1993 |
| DE | A 43 16 012 | 11/1994 |
| EP | 529325 | 3/1993 |
| EP | A-656-241 | 6/1995 |
| EP | 656241 | 6/1995 |
| EP | 257477 | 3/1998 |
| JP | SHO 56-152539 | 11/1981 |
| JP | HEI 5-123921 | 5/1993 |
| JP | 5-340473 A | 12/1993 |
| JP | HEI 7-1229 | 1/1995 |
| JP | 7-91214 A | 4/1995 |
| JP | HEI 8-187620 | 7/1996 |
| JP | 9-293946 | 11/1997 |
| TW | 79101590 | 1/1992 |
| TW | 85111784 | 4/1996 |

OTHER PUBLICATIONS

T'eng–min, Tso, *Special Machining*, Fu Han Press: Ch. 6, pp. 83–93, sec. 6–3–3, Mar. 1986.

* cited by examiner

*Primary Examiner*—Timothy V. Eley
(74) *Attorney, Agent, or Firm*—Sughrue Mion, PLLC

(57) ABSTRACT

A scraping apparatus in which a scraping process is performed on a surface of a work to be machined to form recesses thereon by converging a laser beam outputted from a laser oscillator by a converging lens and irradiating the converged laser beam onto the work relatively moving to the laser beam for removing some portions by being melted or evaporated from the surface thereof.

39 Claims, 11 Drawing Sheets

SCRAPING METHOD

FIELD OF THE INVENTION

The present invention relates to a scraping apparatus as well as a scraping method for scraping a surface of a work to be machined and more particularly, to a scraping apparatus as well as a scraping method for scraping a surface of a work to be machined to form a large number of recesses functioning as oil grooves on the surface of the work as a sliding surface.

BACKGROUND OF THE INVENTION

A scraping process based on the conventional technology for forming a number of recesses as oil grooves on a surface of a work to be machined has generally been performed by scraping the surface of the work with a scraper like a flat chisel. The scraping process described above automatically performed by attaching a scraper to a machine tool for numerical control, a main shaft of a machining center, or to an end of an arm of a machining robot by an automatic control machine without manual works is disclosed in Japanese Patent Laid-Open Publication No. HEI 5-123921, Japanese Patent Laid-Open Publication No. HEI 7-1229, and Japanese Patent Laid-Open Publication No. HEI 8-187620.

Disclosed in Japanese Patent Publication No. SHO 56-152539 is a scraping method for forming a number of recesses as oil grooves on a surface of a work to be machined by hardening the surface of the work in a grid pattern by a laser beam and polishing the surface of the work, and this method is effective because, after the process, a portion other than that of the grid pattern is polished more than the portion of the grid pattern due to a difference of surface hardness between the two portions.

FIG. 11 and FIG. 12 show a machining center for executing the scraping method disclosed in Japanese Patent Laid-Open Publication No. HEI 7-1229. In FIG. 11 and FIG. 12, designated at the reference numeral 100 is a base, at 101 a column provided on the base 100, at 102 a main-shaft base movably provided in the column 101 in the Y-axial direction (direction vertical to a paper surface) as well as in the Z-axial direction (vertical direction), at 103 a main shaft provided on the main-shaft base, at 104 a hand scraper attached to the main shaft 103 and having a scraper 105 with a flat blade, at 106 a work table movable in the X-axial direction with a work W mounted thereon, and at 107 an NC unit for providing controls over the main shaft as well as each axis of the X-axis, Y-axis, and Z-axis.

The hand scraper 104 incorporates therein a swinging mechanism, and swings the scraper 105 along the direction indicated by the arrow A (Refer to FIG. 12).

In the machining center as described above, the scraper 105 of the hand scraper 104 is swung in the direction indicated by the arrow A under the controls of the main shaft as well as controls in directions of the X-axis, Y-axis, and Z-axis by the NC unit 107, and with this feature the scraping process having the same precision as that obtained through manual works by a highly skilled worker is automatically performed over a specified area on the surface of the work without the manual works.

Although the conventional type of scraping process can be automated, any of the processes is carried out by cutting or polishing the surface with a tool, so that, when a surface to be machined is extremely hard, a long time is required for machining, and if a super hard material is to be machined, a costly scraper has to be used, which causes increase of the machining cost. Also, a high-precision scraping process requires high-precision calibration of the tool due to abrasion or the like is required, so that obtained scraping precision is restricted.

Also, a form of an oil groove or of a pattern in the scraping process is restricted by a form of a tool, and for this reason, sometimes an oil groove or a pattern in a desired form can not be carried out.

SUMMARY OF THE INVENTION

It is an object of the present invention to obtain a scraping apparatus as well as a scraping method which efficiently carries out a high-precision scraping process regardless of hardness of a work to be machined and without requiring a costly scraper and has high flexibility in selection of a form of an oil groove or a pattern in the scraping process.

With the scraping apparatus according to the present invention, a scraping process is executed on a surface of a work to be machined to form recesses thereon by irradiating a converged laser beam onto the work relatively moving to the laser beam for removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for numerical control.

With the scraping apparatus according to the present invention, in an NC laser apparatus having a laser machining head as well as a work table relatively movable along coordinate axes to a work to be machined, a scraping process is performed on a surface of a work to be machined on the work table to form recesses thereon by irradiating a laser beam onto the work through the laser machining head and removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for the NC laser machining apparatus.

With the scraping method according to the present invention, there is a step of scraping a surface of a work to be machined to form recesses thereon by converging a laser beam outputted from a laser oscillator by a converging lens and irradiating the converged laser beam onto the work relatively moving to the laser beam for removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for numerical control.

With the scraping method according to the present invention, in an NC laser apparatus having a laser machining head as well as a work table relatively movable along coordinate axes to a work to be machined, there is a step of scraping a surface of a work on the work table to be machined to form recesses thereon by irradiating a laser beam onto the work through the laser machining head and removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for the NC laser machining apparatus.

Other objects and features of this invention will become understood from the following description with reference to the accompanying drawings.

DESCRIPTION OF THE PREFERRED EMBODIMENTS

Detailed description is made hereinafter for preferred embodiments of a scraping apparatus as well as of a scraping method according to the present invention with reference to the related drawings.

Figure 1:
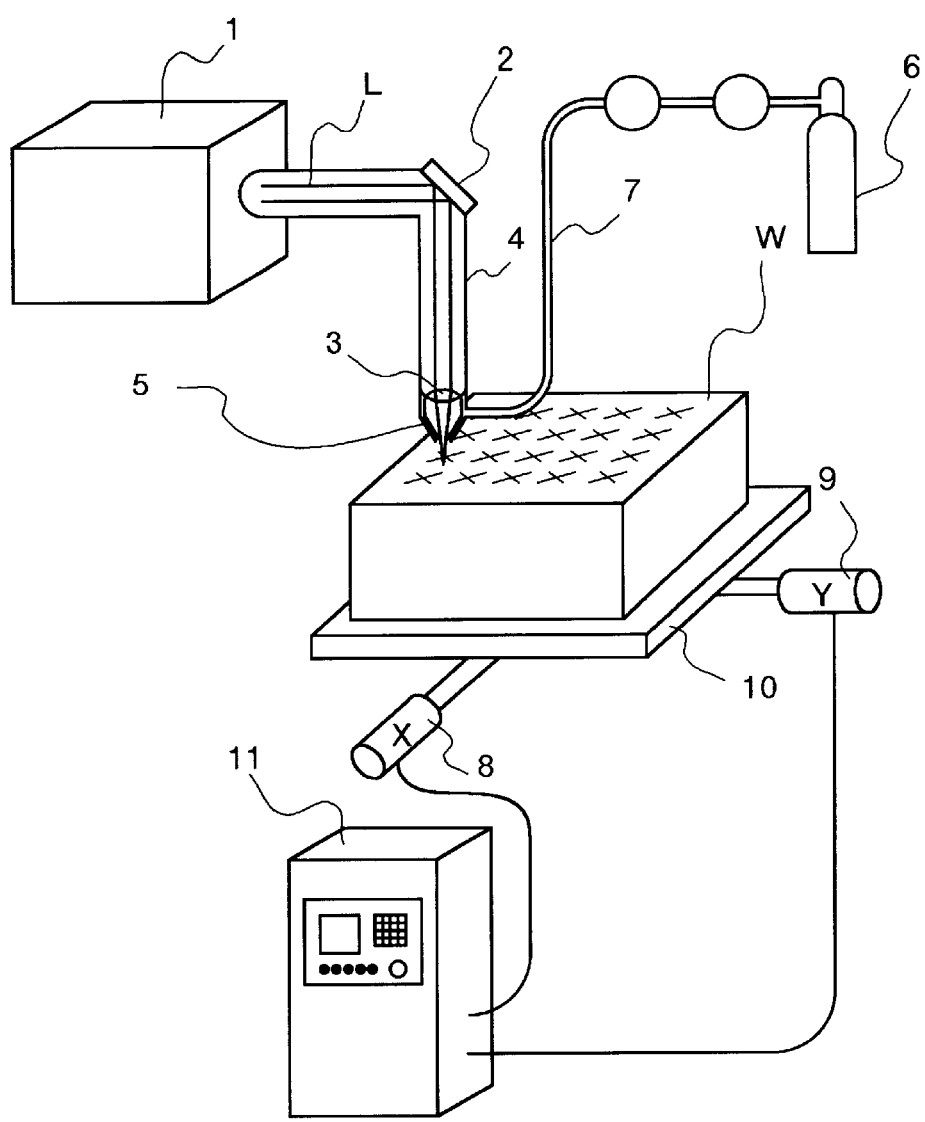
FIG. 1 is a perspective view showing one embodiment of a scraping apparatus according to the present invention.

FIG. 1 shows one embodiment of the scraping apparatus according to the present invention. This scraping apparatus is an NC laser machining apparatus and comprises a laser oscillator 1; a laser machining head 4 attached to a column (not shown in the figure) or the like having a mirror 2 and a converging lens 3 or the like; a nozzle 5 provided at a tip of the laser machining head 4; an assist gas piping 7 for leading assist gas such as nitrogen, oxygen, and argon from an assist gas bomb 6 to the nozzle 5; an XY work table unit 10 with a work W to be machined thereon moving in the X-axial direction and the Y-axial direction by an X-axial servo motor 8 and a Y-axial servo motor 9; and an NC unit 11 for providing controls over each of the axes.

Laser machining is performed by leading a laser beam L outputted from the oscillator 1 to a machining position by the mirror 2 or the like, converging the laser beam by the converging lens 3, and irradiating the converged laser beam L onto a work W to be machined at an adjacent position to the focal point. During this laser machining, an assist gas is sprayed onto the work through the nozzle 5 as necessary so as to promote machining as well as to prevent oxidation of the work.

As described above, by irradiating the converged laser beam L to the work W, some portions on the surface of the work are removed by being melted or evaporated therefrom with recesses formed on the surface, and a scraping process is performed by laser machining based on the removal by melting or evaporation.

As for a scraped form, by moving the XY work table unit 10, namely the work W on the XY work table unit 10 in the X- and Y-axial directions with respect to a position irradiated by a laser beam as a spot (machining position) according to a machining program for the NC unit 11, an arbitrary form can be set, and by repeating the machining processing in a decided form, a high-precision scraping process can easily be realized with a simple machining program.

Figure 2:
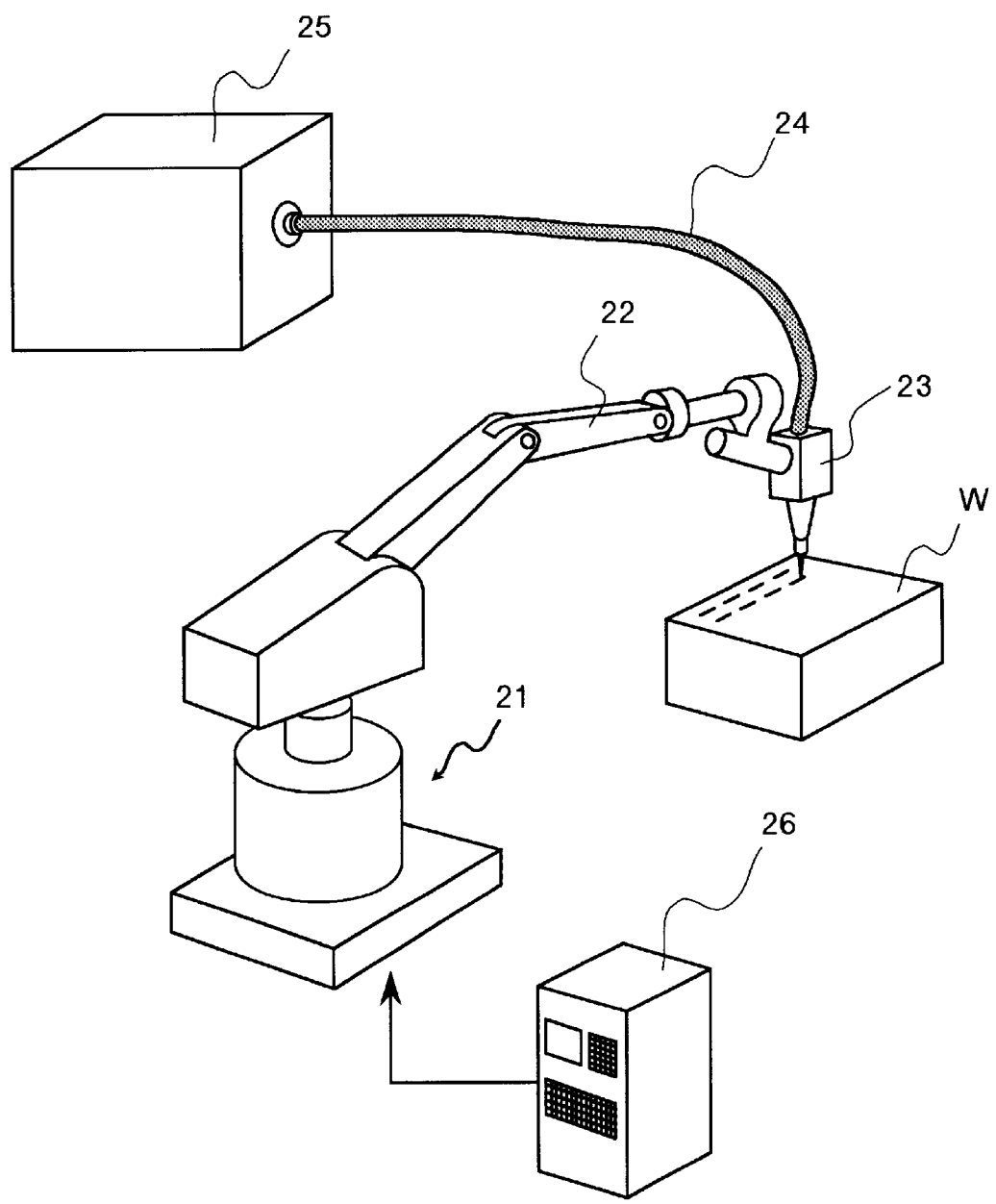
FIG. 2 is a perspective view showing another embodiment of the scraping apparatus according to the present invention.

FIG. 2 shows another embodiment of the scraping apparatus according to the present invention. This scraping apparatus is an NC laser machining robot, and a laser machining head 23 as one of effectors is attached to an end of the arm 22 for a machining robot 21. The laser machining head 23 can take an arbitrary position or orientation by arm movement of the machining robot 21. The laser machining head 23 is optically connected to a laser oscillator 25 through optical fibers 24 or the like to supply a laser beam outputted from the laser oscillator 25 to the head. The arm movement of the machining robot 21 is carried out by an NC unit 26 for robot control.

In this embodiment, by irradiating a converged laser beam converged by a converging lens incorporated in the laser machining head 23 onto a work W to be machined at an adjacent position to the focal point, some portions on the surface of the work are removed by being melted or evaporated therefrom so as to form recesses on the surface, and a scraping process is performed by laser machining based on the removal by melting or evaporation. In this case also, an arbitrary form can be set as a scraped form by driving the arm 22 of the machining robot 21 and scraping can be applied onto an arbitrary surface of a cube according to the machining program of the NC unit 26.

Machining with a laser beam having a green (wavelength of 5.3 $\mu$m) wavelength as a frequency twice as high as that of the YAG laser by Q switching oscillation in this laser machining can acquire nice and fine grooves suitable for a scraped form with low power.

Figure 3A:
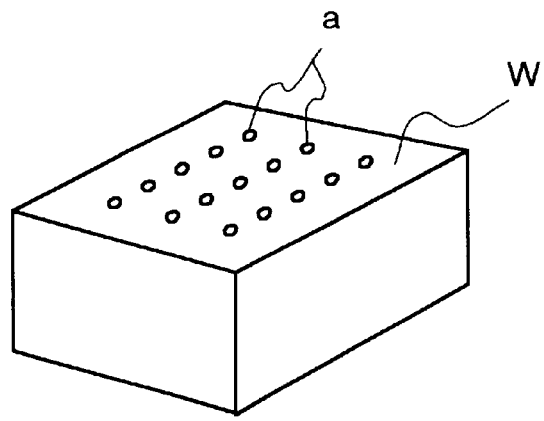
FIG. 3A is a perspective view showing one example of a work scraped by a scraping method according to the present invention.
Figure 3B:
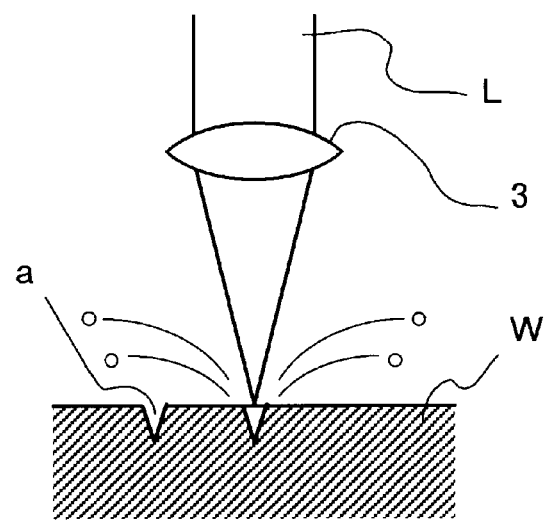
FIG. 3B is an explanatory view showing how the work is being scraped.

FIG. 3A and FIG. 3B show examples of scraping process for irradiating a laser beam L onto the identical position without changing a relative position between the work W to be machined and an laser beam irradiated position, and machining a hole with a bottom such as piercing hole with a bottom by a laser machining. The scraped form in this case is a cluster of pierced holes each with a bottom formed by laser irradiation onto the same point. In this scraping process, holes each with a fine diameter and being comparatively deep in depth can be machined, and by successively changing machining positions for laser machining at each point, a large number of holes as oil grooves can be formed on the surface to be scraped.

Figure 4A:
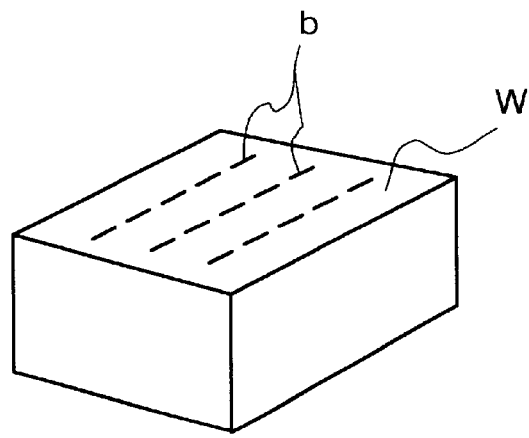
FIG. 4A is a perspective view showing another example of the work scraped by the scraping method according to the present invention.
Figure 4B:
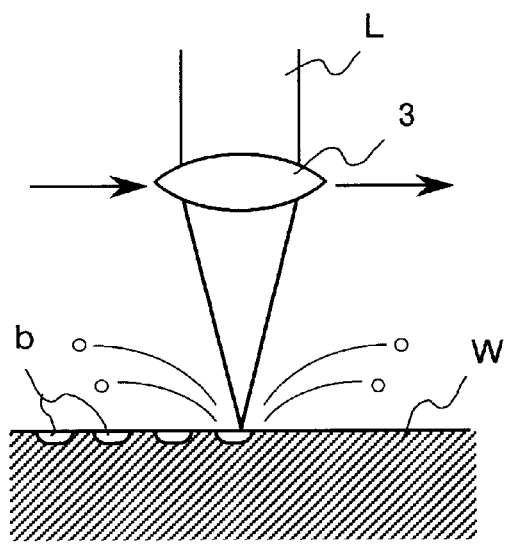
FIG. 4B is an explanatory view showing how the work is being scraped.

FIG. 4A and FIG. 4B show examples of scraping process in which scraped grooves b are formed by means of machining by intermittently oscillating (pulse oscillation) a laser beam L and relatively moving the work and the laser beam L. The scraped form in this case is a cluster of scraped grooves b, and relative movement between the work W and the laser beam L may continuously be carried out at a constant speed for the laser machining in this case, and with this feature, a higher machining speed can be obtained, and a scraped groove b with an arbitrary length and pitch can be formed by setting a frequency for pulse emission and a duty ratio of a laser beam L.

Figure 5A:
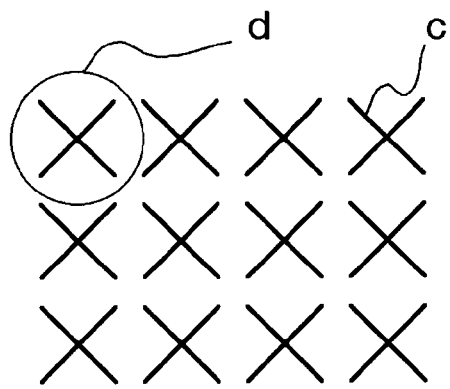
FIG. 5A to FIG. 5C are explanatory views each showing an example of a scraped form obtained by the scraping method according to the present invention respectively.
Figure 5B:
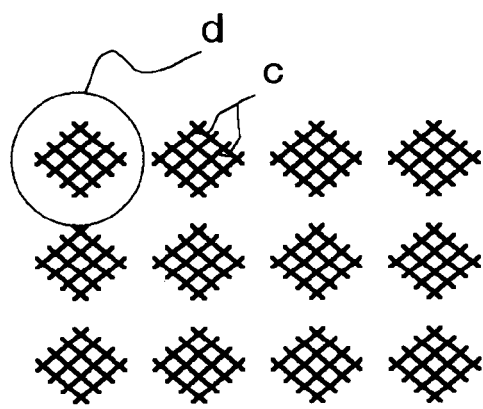
Figure 5C:
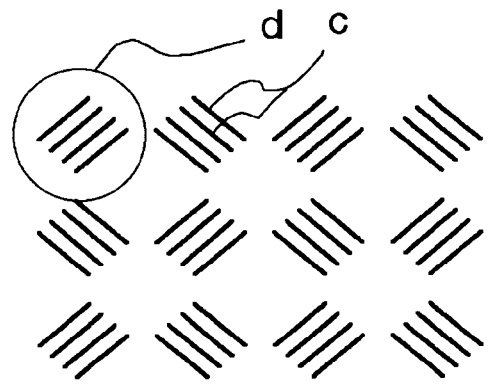

FIG. 5A to FIG. 5C show examples of scraped forms based on combinations of a plurality of short linear grooves c each obtained by laser machining, and a scraping process is performed by repeatedly subjecting a narrow area d to pattern processing. The scraped form in this case is a cluster of forms in narrow areas d each obtained by a combination of a plurality of short linear grooves c.

Figure 6A:
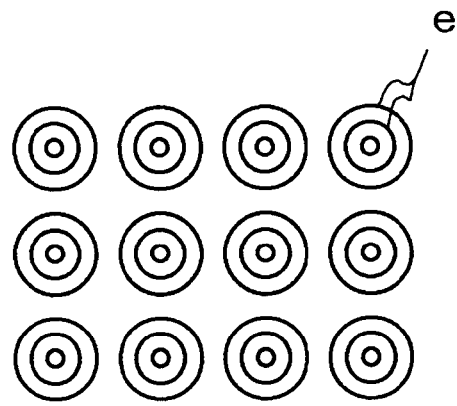
FIG. 6A and FIG. 6B are explanatory views each showing an example of a scraped form obtained by the scraping method according to the present invention respectively.
Figure 6B:
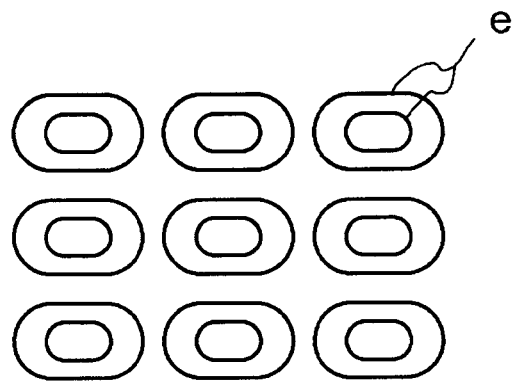

FIG. 6A and FIG. 6B show examples of scraping process to form circular or oval grooves e by means of laser machining under controls for circular interpolation. The scraped form in this case is a cluster of forms in narrow areas each obtained by a combination of circular grooves or oval grooves, and the scraping process to obtain this form can easily be performed, although the process can not be performed by machine working or manual processing based on a machining center or the like, in the laser machining according to a trail of a laser beam.

Figure 7:
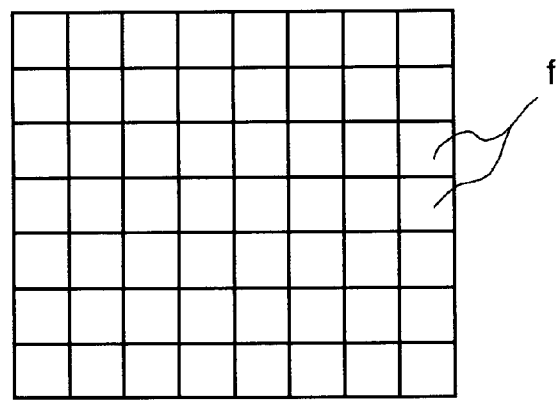
FIG. 7 is an explanatory view showing an example of a scraped form obtained by the scraping method according to the present invention.

FIG. 7 shows an example of an operation for machining an area to be machined to form grooves in a grid pattern thereon with laser machining. The scraped form in this case comprises grooves f in a grid pattern over the area to be scraped, and this scraping process is linear machining, and for this reason, a machining program is easily obtained and machining can be performed at a high machining speed.

Figure 8:
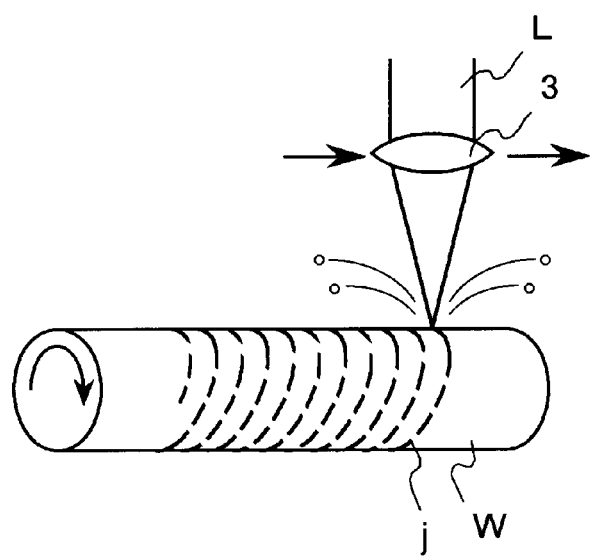
FIG. 8 is a perspective view showing an embodiment of the scraping method according to the present invention.

FIG. 8 shows an example of an operation for subjecting a peripheral surface of a cylindrical material W to scraping process to form a screwed groove j thereon by rotating the cylindrical material W such as a shaft around its central axis and moving a position irradiated by a laser L in the axial direction of the cylindrical material W for scanning.

Figure 9:
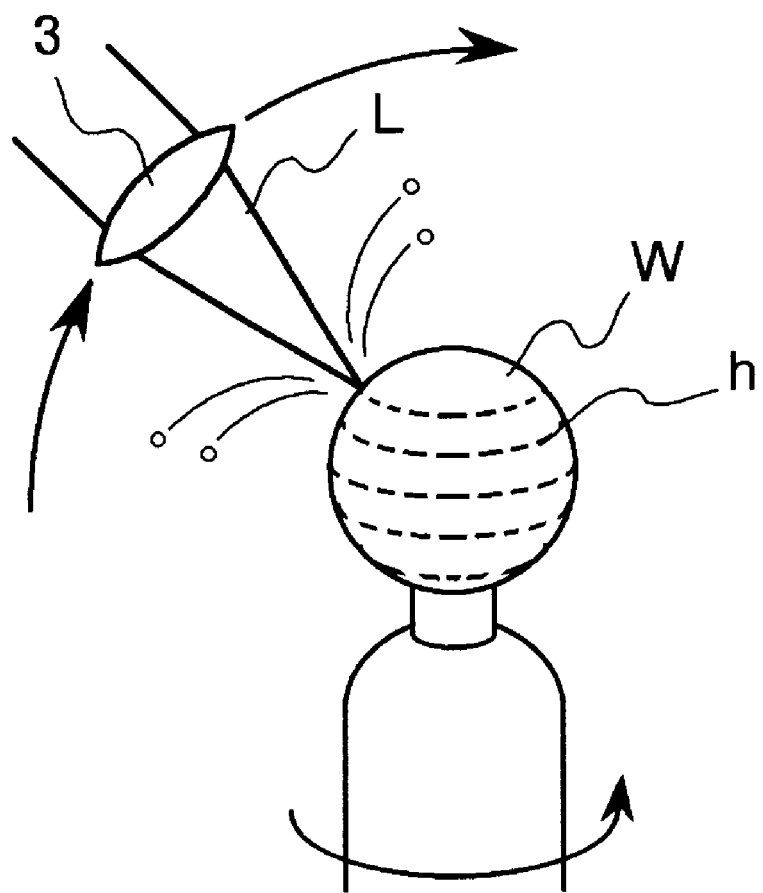
FIG. 9 is a perspective view showing another embodiment of the scraping method according to the present invention.

FIG. 9 shows an example of an operation for subjecting a peripheral surface of a sphere W to scraping process to form a screwed groove h thereon by rotating the sphere W like a spherical coupler around its vertically central axis and moving a position irradiated by a laser L around the horizontally axial direction of the sphere W for scanning.

In the examples in FIG. 8 and FIG. 9, the screwed grooves j and h become continuous grooves by continuously oscillating a laser beam, and become intermittent grooves by pulse oscillation.

Figure 10A:
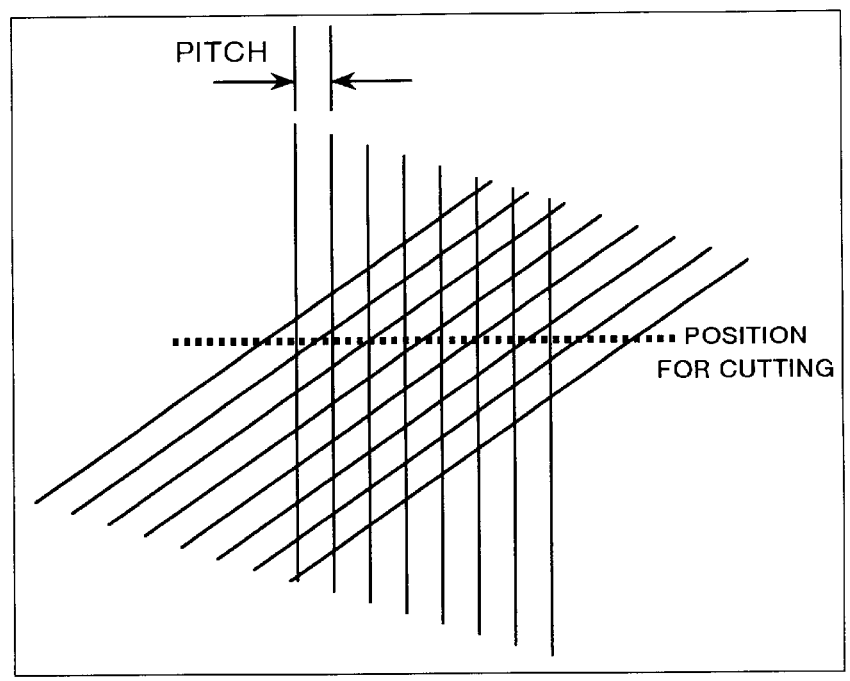
FIG. 10A is a plan view showing an example of scraped form obtained by the scraping method according to the present invention.
Figure 10B:
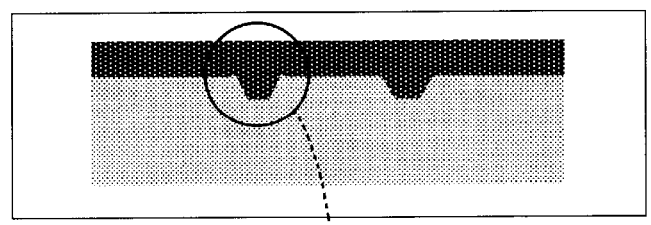
FIG. 10B is an enlarged cross-sectional view of a portion of the grooves.
Figure 10C:
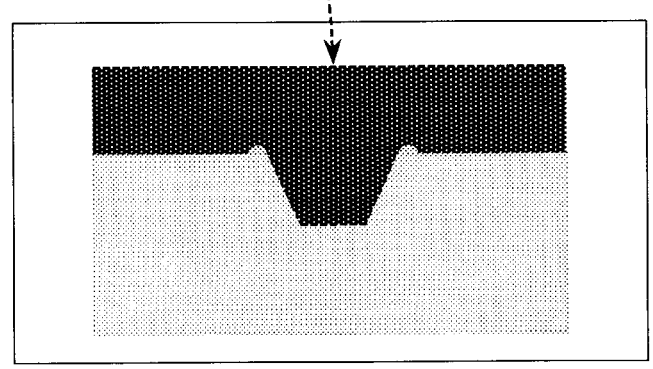
FIG. 10C is a cross-sectional view of the portion of the groove according to further higher magnification.
Figure 11:
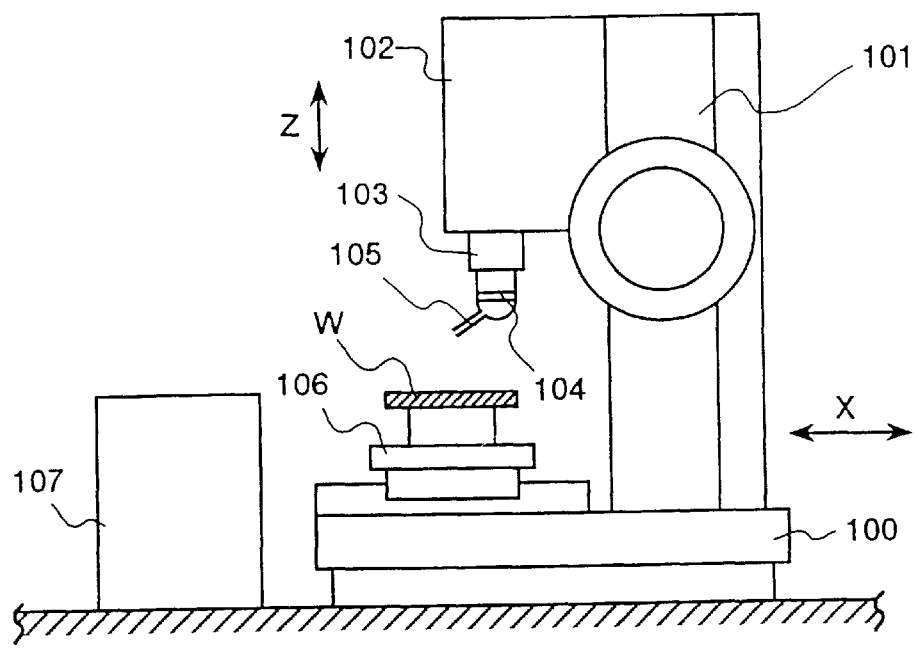
FIG. 11 is a front view showing the scraping apparatus based on the conventional technology.
Figure 12:
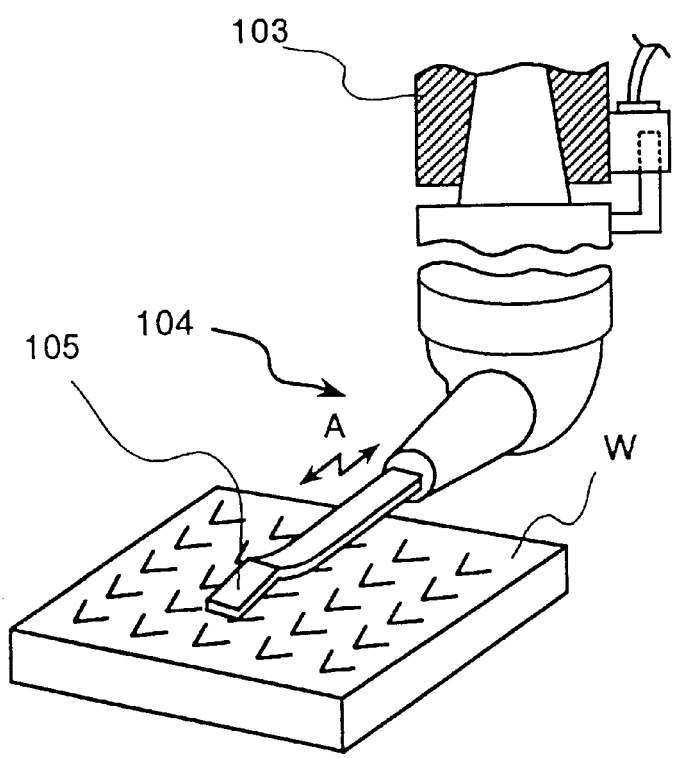
FIG. 12 is an enlarged perspective view of a scraping section in the scraping apparatus based on the conventional technology.

FIG. 10A to FIG. 10C show examples of operations each for scraping a groove by means of laser machining. Each of the figures shows an example in which a YAG laser having a green wavelength (double harmonic) of 3.5 W output generated by Q switching (8 kHz) oscillation is used for machining, and in the examples the laser moves along a surface of a casting by 5 m/min, and nitrogen gas is used as an assist gas. Scraped grooves each being as fine as that with a width of 42.5 $\mu$m and a depth of 27.5 $\mu$m can be realized in this machining. A machining speed in this case is fast enough to be practically used as industrial use.

The scraping process with a laser beam is applicable to form oil grooves on a sliding surface made of material other than metal such as plastics, ceramics or glass, which is one of characteristics of the scraping process with a laser beam.

Also, by separating a laser beam outputted from one unit of laser oscillator into a plurality of laser beams, and simultaneously machining a plurality of works by the plurality of laser beams, or machining an identical work concurrently from a plurality of positions, so that a scraping process can be realized by laser machining with high efficiency and high speed.

As clearly understood from the above description, with the invention, a scraping process is executed on a surface of a work to be machined to form recesses thereon by irradiating a converged laser beam onto the work relatively moving to the laser beam for removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for numerical control.

With the invention, in an NC laser apparatus having a laser machining head as well as a work table relatively movable along coordinate axes to a work to be machined, a scraping process is performed on a surface of a work to be machined on the work table to form recesses thereon by irradiating a laser beam onto the work through the laser machining head and removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for the NC laser machining apparatus.

With the invention, a scraping process is performed by a laser machining head attached to an end of an arm of a machining robot for numerical control, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for the machining robot.

With the invention, a laser beam used according to the invention is a double harmonic of an output beam generated by a YAG laser oscillator by means of Q switching oscillation, so that a fine and high-quality scraping process can be performed with low power.

With the invention, there is a step of scraping a surface of a work to be machined to form recesses thereon by converging a laser beam outputted from a laser oscillator by a converging lens and irradiating the converged laser beam onto the work relatively moving to the laser beam for removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for numerical control.

With the invention, in an NC laser apparatus having a laser machining head as well as a work table relatively movable along coordinate axes to a work to be machined, there is a step of scraping a surface of a work on the work table to be machined to form recesses thereon by irradiating a laser beam onto the work through the laser machining head and removing some portions by being melted or evaporated from the surface thereof, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for the NC laser machining apparatus.

With the invention, there is a step of scraping based on a laser machining by attaching a laser machining head to an end of an arm of a machining robot for numerical control, so that a high-precision scraping process can efficiently and automatically be performed regardless of hardness of a work to be machined and without requiring a costly scraper, and also a scraping process having high flexibility in selection of forms for an oil groove or a pattern can be performed according to a machining program for the machining robot.

With the invention, a laser beam used according to the invention is a double harmonic of an output beam by a YAG laser oscillator by means of Q switching oscillation, so that a fine and high-quality scraping process can be performed with low power.

With the invention, a scraped form is a cluster of pierced holes each with a bottom formed by a laser irradiation at the identical point, so that a high-quality scraped surface can be obtained by laser machining.

With the invention, a scraped form is a cluster of grooves formed by relatively moving a work to be machined under laser irradiation with intermittently oscillated pulses, so that a high-quality scraped surface can efficiently be obtained by laser machining.

With the invention, a scraped form is a cluster of forms in narrow areas each obtained by a combination of a plurality of short linear grooves, so that a high-quality scraped surface can be obtained by laser machining.

With the invention, a scraped form is a cluster of forms in narrow areas each obtained by a combination of circular grooves or oval grooves, so that a high-quality scraped surface can be obtained by laser machining, which can not be obtained by machine works or manual operations.

With the invention, a scraped form comprises grooves in a grid pattern over an area to be scraped, so that a high-quality scraped surface can efficiently be obtained by laser machining.

With the invention, there are steps of rotating a work to be machined placed on a body of rotation, moving a laser beam for scanning, and irradiating the laser beam onto the work, so that a high-quality scraping process according to laser machining can be subjected to a circular surface or a spherical surface.

This application is based on Japanese patent application No. HEI 10-12632 filed in the Japanese Patent Office on Jan. 26, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A scraping method comprising:
   a step of scraping a surface of a work to be machined by converging a laser beam outputted from a laser oscillator by a converging lens and irradiating the converged laser beam onto said work in order to form recesses on said surface of said work by removing only some portions of said surface of said work by melting or evaporating said portions from said surface of said work, wherein said work moves relatively to said laser beam,
   each of said recesses is formed with a single stroke of movement of said work, and
   each of said recesses is dimensioned for retaining oil therein.

2. A scraping method according to claim 1, wherein said laser beam is a double harmonic of an output beam from a YAG laser oscillator processed by Q switching oscillation.

3. A scraping method according to claim 1, wherein a scraped form is a cluster of pierced holes each with a bottom formed by a laser irradiation at the identical depth.

4. A scraping method according to claim 1, wherein a scraped form is a cluster of grooves formed by relatively moving said work to be machined under laser irradiation with intermittently oscillated pulses.

5. A scraping method according to claim 1, wherein a scraped form is a cluster of forms in narrow areas each obtained by combining a plurality of short linear grooves.

6. A scraping method according to claim 1, wherein a scraped form is a cluster of forms in narrow areas each obtained by combining circular grooves or oval grooves.

7. A scraping method according to claim 1, wherein a scraped form comprises grooves in a grid pattern over an area to be scraped.

8. A scraping method according to claim 1 further comprising:
   rotating said work to be machined placed on a body of rotation;
   moving said laser beam for scanning; and
   irradiating said laser beam onto said work.

9. A scraping method as claimed in claim 1, wherein all of said recesses are spaced by essentially same distances from one another, and have essentially same depths.

10. A scraping method in an NC laser apparatus having a laser machining head as well as a work table, wherein said laser machining head is relatively movable along coordinate axes to a work to be machined, wherein said method comprises:
    scraping a surface of said work to be machined on said work table by irradiating a laser beam onto said work through said laser machining head in order to form recesses on said surface of said work by removing only some portions of said surface of said work by melting or evaporating said portions from said surface of said work,
    each of said recesses is formed with a single stroke of movement of said laser machine head, and
    each of said recesses is dimensioned for retaining oil therein.

11. A scraping method according to claim 10, wherein said laser beam is a double harmonic of an output beam from a YAG laser oscillator processed by Q switching oscillation.

12. A scraping method according to claim 10, wherein a scraped form is a cluster of pierced holes each with a bottom formed by a laser irradiation at the identical depth.

13. A scraping method according to claim 10, wherein a scraped form is a cluster of grooves formed by relatively moving said work to be machined under laser irradiation with intermittently oscillated pulses.

14. A scraping method according to claim 10, wherein a scraped form is a cluster of forms in narrow areas each obtained by combining a plurality of short linear grooves.

15. A scraping method according to claim 10, wherein a scraped form is a cluster of forms in narrow areas each obtained by combining circular grooves or oval grooves.

16. A scraping method according to claim 10, wherein a scraped form comprises grooves in a grid pattern over an area to be scraped.

17. A scraping method according to claim 10 further comprising:
rotating said work to be machined placed on a body of rotation;
moving said laser beam for scanning; and
irradiating said laser beam onto said work.

18. A scraping method as claimed in claim 10, wherein all of said recesses are spaced by essentially same distances from one another, and have essentially same depths.

19. A scraping method comprising:
attaching a laser machining head to an end of an arm of a machining robot for numerical control; and
scraping a surface of a work, using said laser machining head, in order to form recesses on said surface of said work by removing only some portions of said surface of said work by melting or evaporating said portions from said surface of said work,
each of said recesses is formed with a single stroke of movement of said work or said laser machine head, and
each of said recesses is dimensioned for retaining oil therein.

20. A scraping method according to claim 19, wherein a laser beam used for scraping is a double harmonic of an output beam from a YAG laser oscillator processed by Q switching oscillation.

21. A scraping method according to claim 19, wherein a scraped form is a cluster of pierced holes each with a bottom formed by a laser irradiation at the identical depth.

22. A scraping method according to claim 19, wherein a scraped form is a cluster of grooves formed by relatively moving a work to be machined under laser irradiation with intermittently oscillated pulses.

23. A scraping method according to claim 19, wherein a scraped form is a cluster of forms in narrow areas each obtained by combining a plurality of short linear grooves.

24. A scraping method according to claim 19, wherein a scraped form is a cluster of forms in narrow areas each obtained by combining circular grooves or oval grooves.

25. A scraping method according to claim 19, wherein a scraped form comprises grooves in a grid pattern over an area to be scraped.

26. A scraping method according to claim 19, further comprising:
rotating a work to be machined placed on a body of rotation;
moving a laser beam for scanning; and
irradiating said laser beam onto said work.

27. A scraping method as claimed in claim 19, wherein all of said recesses are spaced by essentially same distances from one another, and have essentially same depths.

28. A scraping method comprising:
a step of scraping a surface of a work to be machined by converging a laser beam outputted from a laser oscillator by a converging lens and irradiating the converged laser beam onto said work in order to form recesses on said surface of said work by removing only some portions of said surface of said work, said portions having a final depth which is less than a thickness of said work, by melting or evaporating said portions from said surface of said work, wherein said work moves relatively to said laser beam,
each of said recesses is formed with a single stroke of movement of said work, and
each of said recesses is dimensioned for retaining oil therein.

29. A scraping method according to claim 28, wherein said laser beam is a double harmonic of an output beam from a YAG laser oscillator processed by Q switching oscillation.

30. A scraping method according to claim 28, wherein a scraped form is a cluster of pierced holes each with a bottom formed by a laser irradiation at the identical depth.

31. A scraping method as claimed in claim 28, wherein all of said recesses are spaced by essentially same distances from one another, and have essentially same depths.

32. A scraping method in an NC laser apparatus having a laser machining head as well as a work table, wherein said laser machining head is relatively movable along coordinate axes to a work to be machined, wherein said method comprises:
scraping a surface of said work to be machined on said work table by irradiating a laser beam onto said work through said laser machining head in order to form recesses on said surface of said work by removing only some portions of said surface of said work, said portions having a final depth which is less than a thickness of said work, by melting or evaporating said portions from said surface of said work,
each of said recesses is formed with a single stroke of movement of said laser machine head, and
each of said recesses is dimensioned for retaining oil therein.

33. A scraping method according to claim 32, wherein said laser beam is a double harmonic of an output beam from a YAG laser oscillator processed by Q switching oscillation.

34. A scraping method according to claim 32, wherein a scraped form is a cluster of pierced holes each with a bottom formed by a laser irradiation at the identical depth.

35. A scraping method as claimed in claim 32, wherein all of said recesses are spaced by essentially same distances from one another, and have essentially same depths.

36. A scraping method comprising:
attaching a laser machining head to an end of an arm of a machining robot for numerical control; and
scraping a surface of a work, using said laser machining head, in order to form recesses on said surface of said work by removing only some portions of said surface of said work, said portions having a final depth which is less than a thickness of said work, by melting or evaporating said portions from said surface of said work,
each of said recesses is formed with a single stroke of movement of said work or said laser machine head, and
each of said recesses is dimensioned for retaining oil therein.

37. A scraping method according to claim 36, wherein a laser beam used for scraping is a double harmonic of an output beam from a YAG laser oscillator processed by Q switching oscillation.

38. A scraping method according to claim 36, wherein a scraped form is a cluster of pierced holes each with a bottom formed by a laser irradiation at the identical depth.

39. A scraping method as claimed in claim 36, wherein all of said recesses are spaced by essentially same distances from one another, and have essentially same depths.

* * * * *